United States Patent [19]

Hackett-Jones et al.

[11] Patent Number: 5,651,058
[45] Date of Patent: Jul. 22, 1997

[54] HOTEL INTERACTIVE COMMUNICATION APPARATUS

[76] Inventors: Frank Charles Hackett-Jones, Manoir due Pierre Percee, Ville au Roi, Guernsey, United Kingdom; Emanuele Pasta, Ardeen, Rocky Valley, Kilmacanogue Co. Wicklow, Ireland

[21] Appl. No.: 549,710
[22] PCT Filed: Apr. 26, 1993
[86] PCT No.: PCT/GB93/00865
  § 371 Date: Jan. 18, 1996
  § 102(e) Date: Jan. 18, 1996
[87] PCT Pub. No.: WO93/22865
  PCT Pub. Date: Nov. 11, 1993

[30] Foreign Application Priority Data

Apr. 27, 1992 [GB] United Kingdom ............. 9209081

[51] Int. Cl.⁶ .................................................. H04M 3/42
[52] U.S. Cl. ................... 379/201; 379/67; 379/93.17; 379/216; 379/242
[58] Field of Search .................. 379/67, 88, 89, 379/96, 97, 98, 211, 212, 213, 214, 216, 201, 196, 197, 198, 142, 207, 76, 202, 203, 204, 205, 206, 242, 243, 244, 245, 92; 348/13, 14, 15

[56] References Cited

U.S. PATENT DOCUMENTS

| 4,072,825 | 2/1978 | McLay et al. ............. 379/33 |
| 4,899,369 | 2/1990 | Kondziela ............. 379/101 |
| 5,086,394 | 2/1992 | Shapira ............. 364/419.2 |
| 5,187,735 | 2/1993 | Garcia et al. ............. 379/88 |
| 5,199,062 | 3/1993 | Meister et al. ............. 379/67 |
| 5,355,406 | 10/1994 | Chenginski et al. ............. 379/88 |

FOREIGN PATENT DOCUMENTS

| 0453831 | 10/1991 | European Pat. Off. . |
| 2607340 | 5/1988 | France . |
| 2640451 | 12/1988 | France . |
| WO92/17021 | 10/1992 | WIPO . |

OTHER PUBLICATIONS

"Hotel Communication System", R. Dietsch, Ericson Review No. 1, pp. 51–58. Dec., 1984.
"Just Like the Electronic Home", A.F. Boyce, Communications/Communications International, pp. 19, 21 May 1985.
"Voice Based Remote Database Access", A. Riccio et al., Eurospeech 89, European Conference on Speech Communication and Technology, vol. 1, Paris, France, pp. 561–564. Sep. 26, 1989.
"MD 110/HT-A Hotel Communicaitons System", K. Hassa, Ericson Review No. 2, pp. 70–76 Dec. 1989.

Primary Examiner—Krista M. Zele
Assistant Examiner—Scott L. Weaver
Attorney, Agent, or Firm—Jacobson, Price, Holman & Stern, PLLC

[57] ABSTRACT

A PABX switching network adapted to provide an interactive communication service to hotel guests comprises guest extension lines (4) each serving a telephone apparatus (3) located in individual guest rooms (2). The PABX system (1) is capable of interrogating a property management system (7) identifying the status of each guest room, and to couple a calling telephone apparatus (3) to an interactive call answering system (9) in order to provide a variety of call answering services to a hotel guest, depending upon the status of the guest room as indicated by the property management system (7). Each telephone station (3) incorporates a unique identify signal capable of being interrogated by the PABX (1) in order to enable information from the property management system (7) to be coordinated to the individual hotel guest rooms.

6 Claims, 4 Drawing Sheets

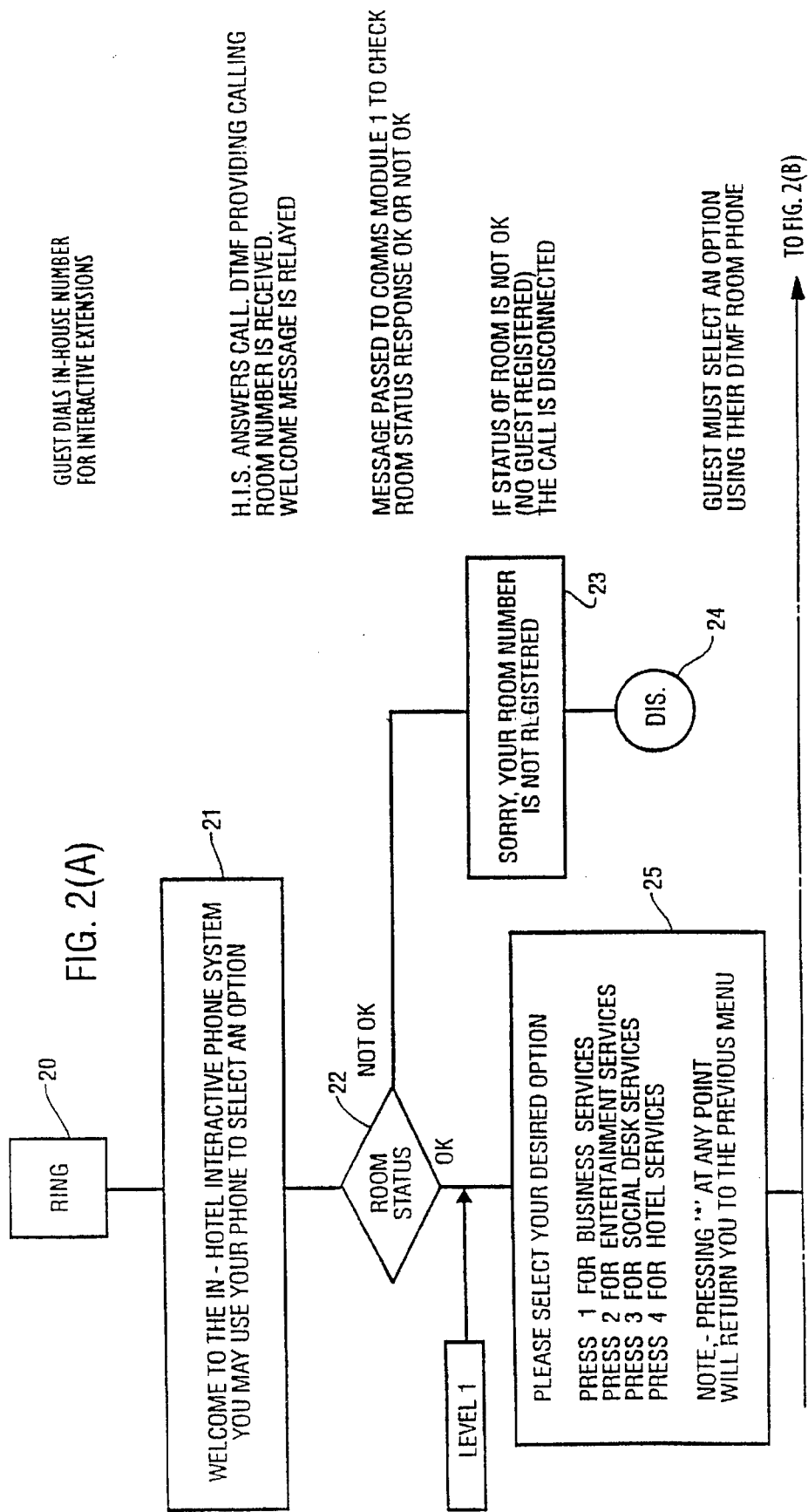

HOTEL INTERACTIVE COMMUNICATION APPARATUS

TECHNICAL FIELD

This invention relates to a hotel interactive communication apparatus capable of responding to a call established from a guest room via a hotel telephone exchange system, in order to provide automatically, via the telephone exchange system, an information or other service demanded by the caller.

BACKGROUND

There is known from Ericson Review Vol.61, No.1, Stockholm SE, P51–58, R. DIETSCh 'Hotel Communication System', a hotel communication apparatus comprising a PABX switching network providing a plurality of guest extension lines each coupled to a respective communication station provided in a guest room, and a property management system for storing room status information concerning each of a plurality of guest rooms served by said guest extension lines, each guest communication station including signalling means operable by a caller for establishing a switched connection, via the PABX switching network.

With the increasing sophistication of modern telephone exchange systems, it is becoming possible for a telephone exchange to provide to a caller a variety of services ancillary to the primary function of the exchange of establishing a switched telephone connection to a single party at a selected destination telephone line. Thus, a modern telephone exchange can provide for multi-party conference calls, so-called 'chat-lines', and a variety of information and entertainment services involving the replaying of recorded messages or selected audio entertainment. EP-A-0453831 describes a system providing control of access to services of the exchange such as call answering based upon identity acknowledgement. A more recent innovation enables a calling party to select a conversation call to another unknown party selected from a pool of available participants based upon characteristic critera deemed by the calling party to be desirable in a party to be called.

The present invention is based upon the concept that the temporary residents in a hotel at any given time represent a pool of potential culling parties to whom could be provided services of the kind available from a public telephone switching system, but which, in the context of the society represented by the transient population of a hotel, can be all the more valuable in that the services can be targeted at providing to a hotel guest, useful services hitherto unavailable in the hotel context.

However, the provision of facilities such as the above in the context of a hotel containing an essentially transient population involves difficulties that do not exist with the analogous services provided by the public telephone exchange system wherein each calling party can be identified in terms of an established subscriber exchange line.

SUMMARY OF THE INVENTION

In accordance with the invention a hotel communication apparatus as net out above is characterised in said PABX network further provides a plurality of interactive extension lines each coupled to an interactive port of a call answering apparatus, that said property management system has a room status port capable of being interrogated by said call answering apparatus, that each guest communication station can establish a connection via an interactive extension lined to said call answering apparatus and further includes identity means individual to that station for providing via said switched connection a signal identifying the room served thereby; that said call answering apparatus includes means responsive to establishment of such a switched connection for obtaining from the identity means of the calling station a corresponding identity signal, means for interrogating said property management system to determine the status of the room sending means arranged to provide to the calling station a message dependent upon the determined status of said room, and that said call answering apparatus is further arranged to establish a pool of guest extension lines determined by selection criteria common to occupants of the corresponding guest rooms and to offer to a calling party the facility of establishing a one-to-one telephone connection with another extension line of said pool by the input of matching selection criteria. Via an appropriate characteristic criteria selection facility, a hotel guest can thus make contact with one or more selected parties from an available pool of willing participants, on the basis of a common interest. Thus, for example, a person staying alone in a hotel could seek a partner for dinner based upon an identification of common interests or could locate, for example, another party seeking a partner for a game of tennis, golf or the like.

In accordance with the invention the automatic exchange system is also able to perform a management function in establishing the identity of a calling party in terms of the relevant hotel room number, establishing the status of the corresponding hotel room, for example whether the hotel room is vacant or is validly let to a hotel guest, and providing a corresponding message to a calling party. Thus, for example, if a call is received from a hotel room identified as vacant and not having valid status for the establishment of a call to the interactive service, a message can be returned indicating that the requested call cannot be connected. If the status of the calling room is valid, then a message can be returned offering a variety of services to the caller, and requesting transmission of a signal selecting a corresponding service. The interactive communication apparatus will include logic means for detecting the corresponding signal received from the caller and programmed to respond by providing an appropriate service to the caller and/or by offering a further stage of selection to which the control program can respond Further preferred features and advantages of the invention will become apparent from the following description taken in conjunction with the accompanying drawings.

BRIEF DESCRIPTION OF THE DRAWINGS

FIG. 2A–2C are a flow chart illustrating the programmed functioning of the apparatus illustrated in FIG. 1.

DESCRIPTION OF THE PREFERRED EMBODIMENTS

Figure 1:
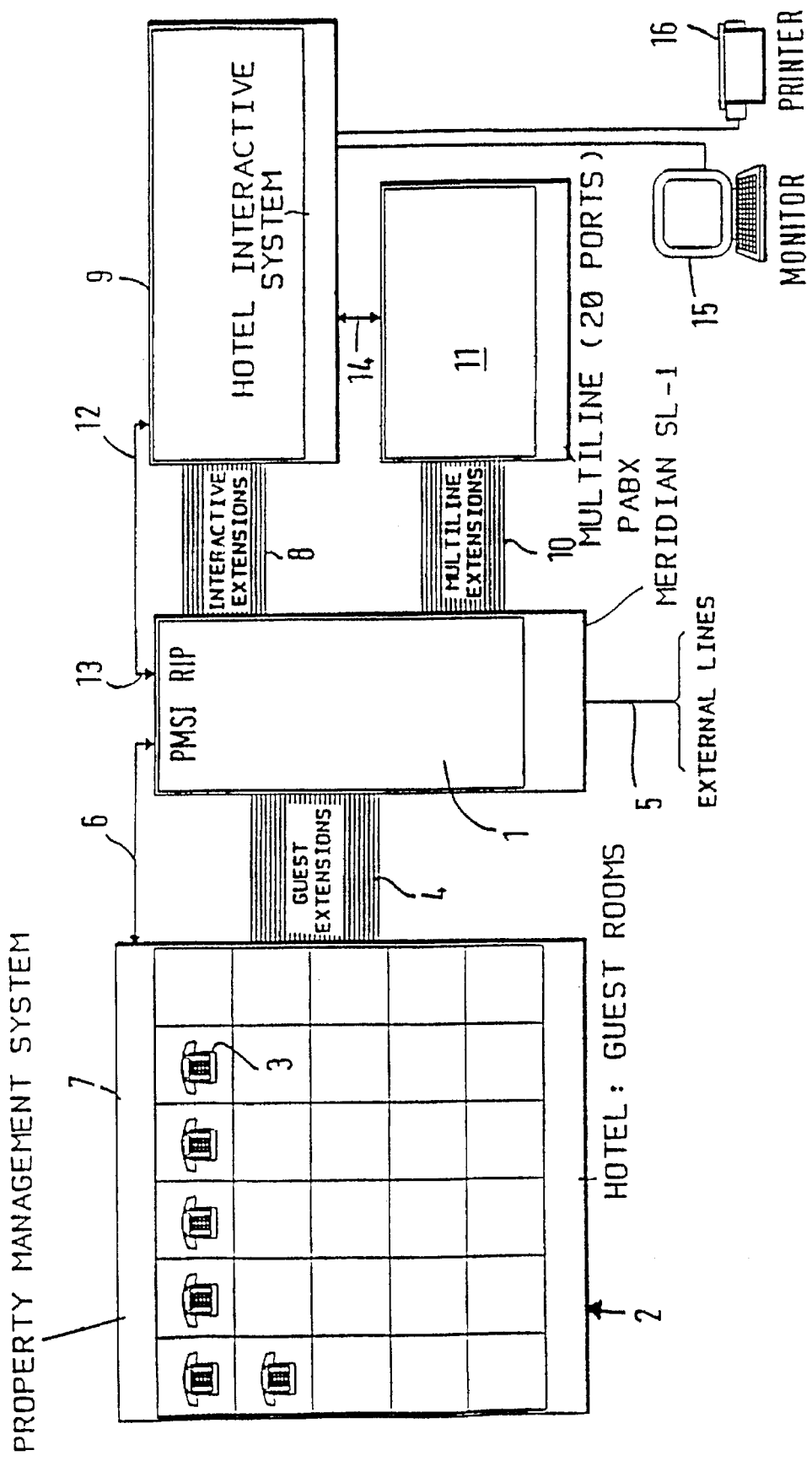
FIG. 1 is a block diagram of a hotel interactive communication apparatus in accordance with one embodiment of the invention.

Referring to FIG. 1, there is illustrated the general arrangement of a hotel interactive communication system in accordance with the invention, wherein the reference numeral 1 indicates the hotel PABX telephone exchange system which is of generally known type. The reference numeral 2 indicates a block of hotel guest rooms each of which includes a DTMF telephone 3 coupled to the exchange 1 via a corresponding one of a plurality of guest extension telephone lines indicated at 4.

The PABX 1 is coupled to external exchange lines as indicated diagrammatically at 5 and also includes internal, programmed logic circuitry, not illustrated, coupled by means of a data bus 6 to a property management system controlled by the hotel management staff. This provides, inter alia, status information concerning each of the hotel guest rooms. Thus for example the property management system can be set to indicate whether a hotel room is vacant, or is validly occupied by a guest registered for access to the telephone exchange system. Such features are well-known features of existing hotel PABX systems and will not therefore be described in detail.

In accordance with the invention, each telephone station 3 is provided with means capable of being interrogated via the corresponding extension line 4 to provide a unique identity signal identifying the room number served by the telephone station. The PABX 1 is further coupled via interactive extension telephone lines 8 to a hotel interactive system illustrated generally at 9.

The PABX 1 is further provided with a plurality of multiline extensions 10 coupled to a multiline system 11 that can be utilised, in known manner, for establishing multiparty connections via the PABX i for example for the purpose of establishing conference calls, chat line calls, or one-to-one connections to an unknown party based on the input of selection criteria.

The hotel interactive system 9 is provided by a micro computer containing interface cards, not illustrated, coupled to the interactive extension lines 8 and capable of responding to DTMF signals transmitted by the lines 8 to perform corresponding logic functions for the purpose of replaying selected recorded messages to the caller, recording messages transmitted by the caller, or establishing a switched connection via the PABX 1 to the caller using the multiline unit 11 and selected multiline extensions 10. The function of such interface cards will be well-known to one skilled in the art and thus will not be described herein in further detail. The system 9 additionally comprises a data port coupled by a data bus 12 to a room inventory port 13 of the PABX 1, via which status information concerning the hotel guest rooms 2 can be obtained from the PABX 1, and a data port coupled via a data bus 14 to the multiline unit 11. These data ports may, for example, comprise the conventional RS232 ports of a micro computer.

The system 9 is further coupled to a monitor 15 and a printer 16 in conventional manner, via which the operation of the system can be supervised by an operator.

Figure 2B:
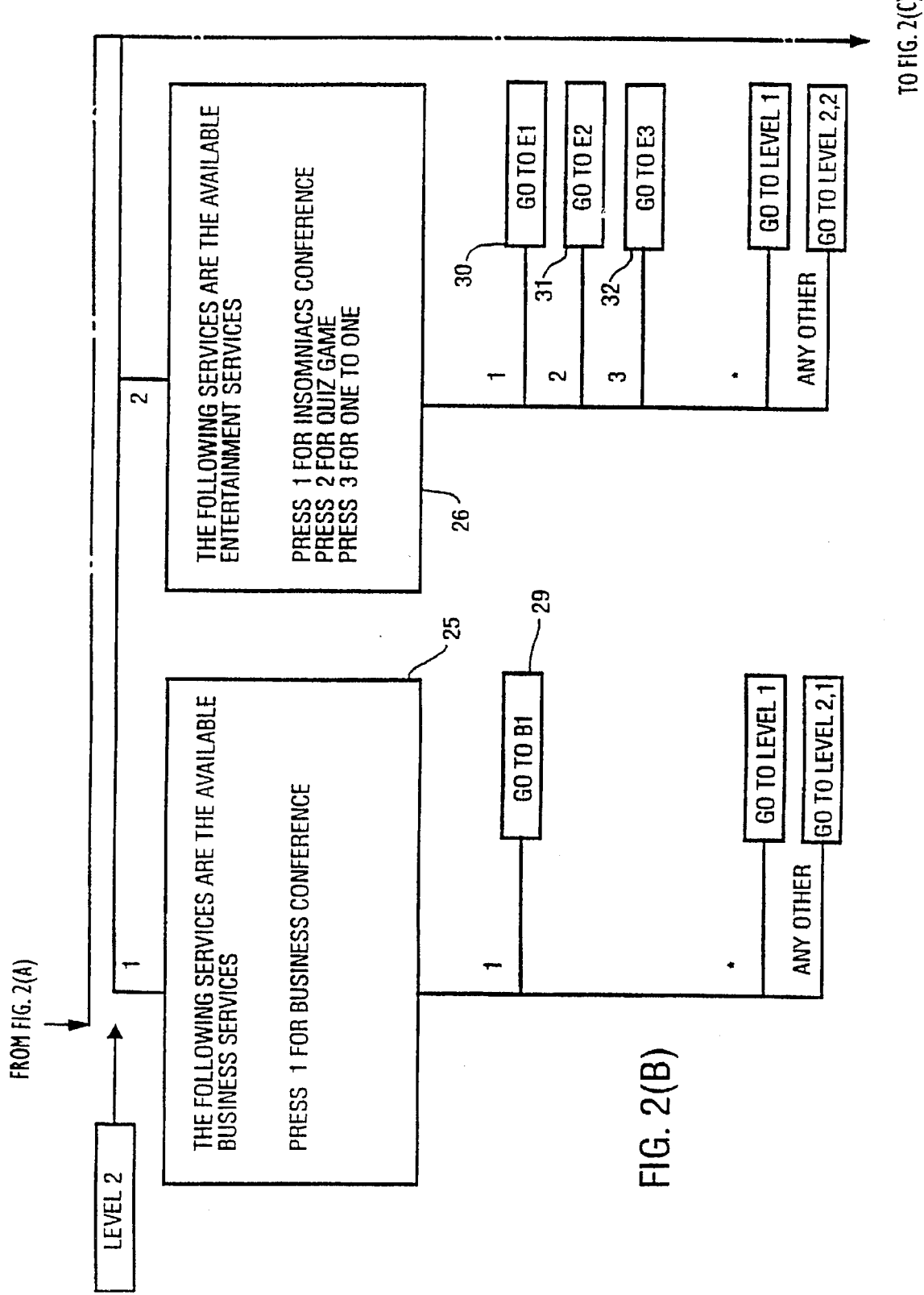
Figure 2C:
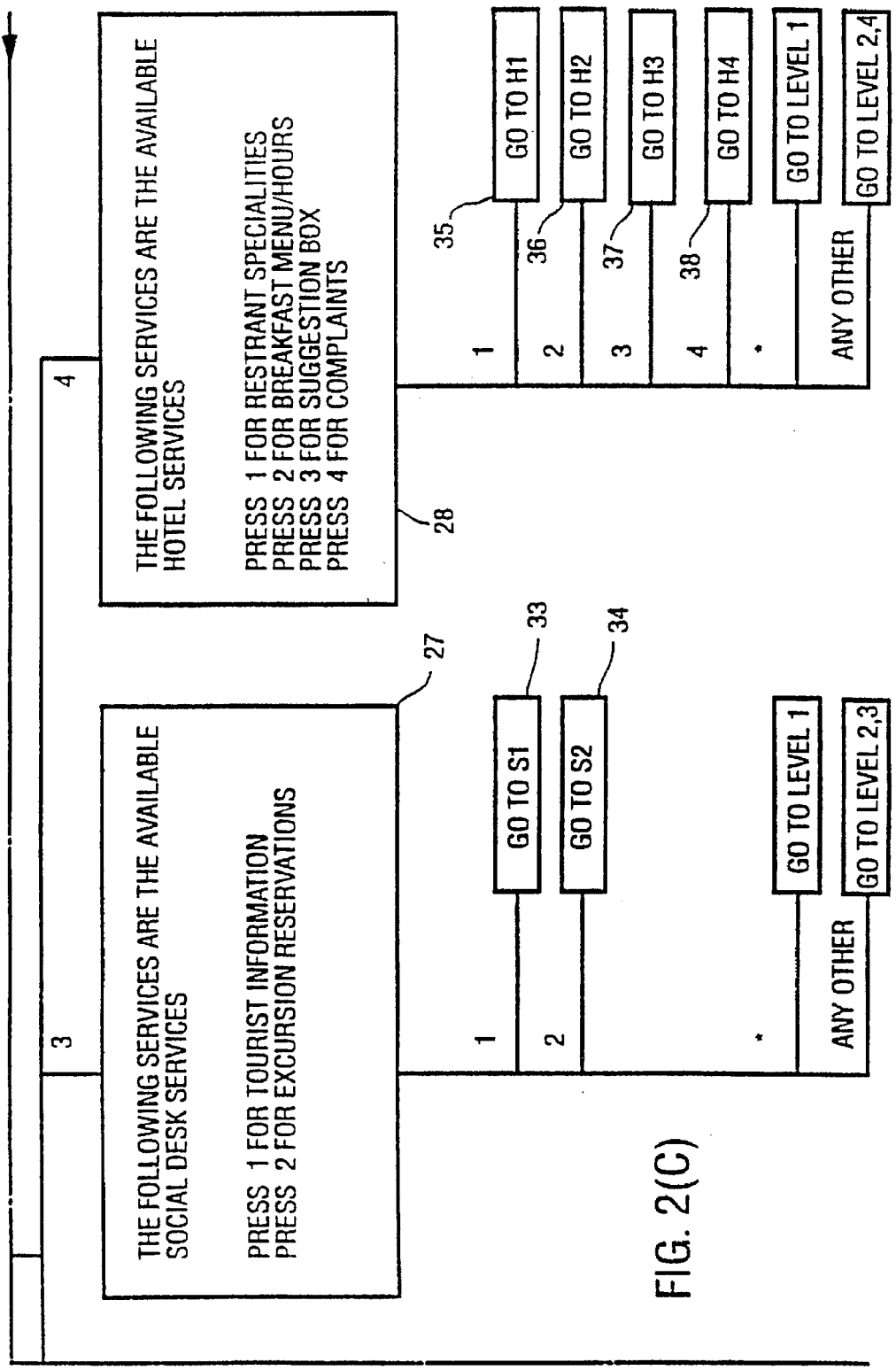

The operation of the system of FIG. 1 will now be described in more detail with reference to the flow chart of FIG. 2.

In order to access the hotel interactive system, a hotel guest will dial an appropriate in house number on the room telephone station and will be connected to an available interactive extension line 8 via the PABX 1. A ringing signal is applied to the line 8 as indicated at point 20 at the commencement of the flow chart of FIG. 2. The control programme of the interactive system 9 will then cause the appropriate interface card to answer the call and transmit an answering message to the caller as indicated at point 21. At the same time, the calling telephone station 3 will be interrogated by the hotel interactive system to obtain a multifrequency tone signal identifying the room number in which the telephone station is located. Via the data bus 12 the system 9 will obtain from the room inventory port 13 of the PABX 1 data indicating the status of the corresponding room, as indicated at point 22. If the room interactive port 13 indicates an invalid status for the room, the programme will branch to point 23 at which the inactive extension interface card is caused to transmit an appropriate message to the caller, as indicated in the box 23, and will then disconnect the call as indicated at point 24.

If the room interactive port 13 indicates a valid status of the room number, then the programme will proceed to level 1 at which a further message is transmitted to the caller as indicated within box 25. Following the transmission of the message the programme proceeds to level 2, at which the interactive extension interface card is enabled to receive one of four optional signals capable of being transmitted via the DTMF key pad. Upon receipt of a corresponding signal the programme will branch to one of four available paths as indicated by boxes 25,26,27 and 28. Alternatively, in conventional manner the caller will be returned to an earlier level of the programme if a wrong signal is transmitted, or the system will time out and disconnect if no signal is received within a predetermined period of time.

In accordance with the key signal transmitted, the programme will cause a corresponding answering message to be transmitted to the caller, as indicated in each of the corresponding boxes 25,26,27 and 28. The interface card of system 9 is then again placed in a condition in which it is enabled to receive a further multifrequency signal enabling a caller to select a corresponding service as already described for level 2 of the programme.

Thus, if the programme has branched to box 25 at level 2, the user has the option of setting up a business conference call by pressing button 1 of his key pad and causing the programme to branch to box 29 for selection of a business conference module of the programme; if the programme has branched to box 26 the caller has the option of branching to one of boxes 30,31 and 32 for selection of programme modules to set up an insomniacs conference, a quiz game or a one-to-one conversation based on selection criteria; if the programme has branched to box 27 the caller can select module 33 for the provision of tourist information or module 34 enabling an excusion reservation to be made; if the programme has branched to box 28 the caller can select module 35 to obtain information on restaurant specialities, module 36 to receive a recorded message giving the breakfast menu and times or module 37 or 38 to enable recording of an appropriate message for the hotel management. It will be appreciated that functioning of the individual modules 29 to 38 can be achieved according to known techniques familiar to one skilled in the art, and these individual functions do not form part of the invention.

Whilst one example of the invention has been described above, it will be appreciated that various alterations and modifications may be made to the apparatus without departing from the scope of the invention. Thus, although the system has been described as operating with standard DTMF telephone handsets coupled to the guest extensions 4, it will be appreciated that in place of the telephone handsets or in addition thereto each hotel room may be provided with a video text terminal coupled to the guest extension line via an appropriate modem. The hotel interactive system 9 will then, instead of the interface cards described above, or in addition thereto, be provided with video text interface cards and corresponding modems coupled to interactive extension lines 8.

Thus it will be seen that an arrangement in accordance with the invention serves to provide a hotel guest with novel facilities specifically adapted to a hotel environment.

We claim:

1. A hotel communication apparatus comprising a PABX switching network connected to a plurality of guest extension lines each coupled to a respective guest communication station provided in a guest room, and a property management system connected to said PABX switching network for storing room status information concerning each of a plurality of guest rooms served by said guest extension lines, each guest communication station including signalling means operable by a caller for establishing a switched connection, via the PABX switching network, wherein said PABX switching network is further connected to a plurality of interactive extension lines each coupled to an interactive port of a call answering apparatus, said property management system having a room status port capable of being interrogated by said call answering apparatus, each guest communication station being adapted to establish said switched connection via said PABX switching network and an interactive extension line, to said call answering apparatus, each guest communication station further including identity means individual to that guest communication station for providing via said switched connection an identity signal identifying the room served thereby; wherein said call answering apparatus includes means responsive to establishment of said switched connection for obtaining from the identity means of a calling guest communication station the identity signal associated therewith, means responsive to the identity signal for interrogating said property management system to determine the status of the room corresponding to said identity signal and answering message sending means responsive to said determined status for providing via said switched connection, a message to the calling quest communication station, which message is dependent upon the determined status of said room, and wherein said call answering apparatus is further arranged to establish a pool of said guest extension lines determined by selection criteria common to occupants of corresponding guest rooms and to offer to a calling party an opportunity to establish a one-to-one telephone connection with another extension line of said pool by inputting matching selection criteria.

2. An apparatus according to claim 1, wherein each said guest communication station comprises a DTMF telephone.

3. An apparatus according to claim 1, wherein each said guest communication station comprises a video text terminal.

4. An apparatus according to claim 1, wherein said answering message sending means includes a first answering message module arranged to send in response to determination of an invalid room status, a first answering message advising that a call cannot be completed and arranged to send in response to determination of a valid room status, a second message inviting a caller to select one of a plurality of call answering services by transmitting a corresponding signal from the calling guest communication station.

5. An apparatus according to claim 4, further including a second answering message module arranged to become enabled upon transmission of said second answering message and to respond to any one of a plurality of predetermined signals capable of being transmitted from the calling station by transmitting for each signal a corresponding answering message.

6. An apparatus according to claim 4, further including a message recording module arranged to become enabled upon transmission of said second answering message and to respond to a predetermined signal transmitted from the calling station.

* * * * *